(12) United States Patent
Bahr

(10) Patent No.: US 9,077,210 B2
(45) Date of Patent: Jul. 7, 2015

(54) STATOR FOR AN ELECTRIC MACHINE HAVING END WINDINGS PRESSED INTO A HOUSING

(71) Applicant: Robert Bosch GmbH, Stuttgart (DE)

(72) Inventor: Markus Bahr, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 284 days.

(21) Appl. No.: 13/866,767

(22) Filed: Apr. 19, 2013

(65) Prior Publication Data

US 2013/0278088 A1    Oct. 24, 2013

(30) Foreign Application Priority Data

Apr. 19, 2012   (DE) .......................... 10 2012 206 442

(51) Int. Cl.
| | |
|---|---|
| *H02K 9/00* | (2006.01) |
| *H02K 15/02* | (2006.01) |
| *H02K 5/04* | (2006.01) |
| *H02K 9/22* | (2006.01) |
| *H02K 15/00* | (2006.01) |
| *H02K 15/14* | (2006.01) |
| *H02K 5/20* | (2006.01) |

(52) U.S. Cl.
CPC .............. *H02K 9/00* (2013.01); *Y10T 29/49009* (2015.01); *H02K 15/02* (2013.01); *H02K 5/04* (2013.01); *H02K 5/20* (2013.01); *H02K 9/22* (2013.01); *H02K 15/0043* (2013.01); *H02K 15/14* (2013.01)

(58) Field of Classification Search
USPC ............................ 310/43, 52–59, 64, 89, 260
See application file for complete search history.

(56) References Cited

U.S. PATENT DOCUMENTS

| 4,384,226 A | * | 5/1983 | Sato et al. ....................... 310/89 |
|---|---|---|---|
| 6,426,579 B1 | * | 7/2002 | Oda et al. ............... 310/216.001 |
| 6,445,095 B1 | * | 9/2002 | Liang et al. ..................... 310/64 |
| 7,459,817 B2 | * | 12/2008 | VanLuik et al. ................ 310/89 |
| 7,675,209 B2 | * | 3/2010 | Masoudipour et al. ......... 310/89 |
| 7,868,497 B2 | * | 1/2011 | Miyairi et al. .................. 310/88 |
| 2002/0047480 A1 | * | 4/2002 | Heim ............................ 310/260 |

* cited by examiner

*Primary Examiner* — Thanh Lam
(74) *Attorney, Agent, or Firm* — Michael Best & Friedrich LLP

(57) ABSTRACT

A stator (1) and a method for manufacturing such a stator for an electric machine. Windings of the stator (1) protrude in the longitudinal direction beyond a cylindrical stator body (3) in the form of end windings (17, 19) on end faces (13, 15) of the stator body (3). In this case, a complementarily designed accommodating region (31) is provided on a housing (21), with the result that, when the housing (21) is assembled with the stator body (3), the windings of the end winding (17) can be pressed. As a result, good thermal contact can be effected between the end winding (17) and the housing (21), which is cooled via a cooling apparatus (25), for example.

11 Claims, 4 Drawing Sheets

STATOR FOR AN ELECTRIC MACHINE HAVING END WINDINGS PRESSED INTO A HOUSING

BACKGROUND OF THE INVENTION

The present invention relates to a stator for an electric machine and to a method for manufacturing such a stator.

Electric machines are used for a wide variety of purposes for example in the form of electric motors or generators. In this case, the electric machine has a stationary stator and a rotor which rotates relative to this stator. Typically, a large number of windings of an electrically conductive wire are provided on the stator in order to form electromagnets with the aid of these windings, which electromagnets can be used, during operation of the electric machine, to generate alternating magnetic fields, for example.

The windings can be arranged on or in a stator body, wherein the stator body is generally formed from a magnetizable material, usually from a metallic material. In this case, the stator body generally has a cylindrical form, wherein the windings can be oriented on the stator body in a direction parallel to the mid-axis of the cylinder or at a slight angle to the mid-axis of the cylinder.

At the front and rear ends of the stator body, the windings in this case protrude beyond the stator body and are usually deflected into bundles, with the result that so-called end windings are formed at the end faces of the stator body. While the windings run in substantially linear fashion and parallel to or at an acute angle to the mid-axis of the cylindrical stator body in the region of the stator body, the windings are deflected in the region of the end windings in such a way that they run at least partially in the circumferential direction of the cylindrical stator body, wherein the windings are located outside the stator body in the region of the end windings and protrude beyond the end faces of said stator body.

For this purpose, in conventional electric machines, the windings arranged on the stator body are first embossed in the protruding regions and then a fixing band is wrapped around said windings, which is a complicated procedure. The end winding produced in this way is generally exposed to the air when the electric machine is completely assembled, as a result of which the windings in the region of the end winding can at best be cooled poorly.

SUMMARY OF THE INVENTION

Stators for electric machines in accordance with embodiments of the present invention enable improved cooling of the entire stator including the regions of the end windings and can also be simple to manufacture.

The invention proposes providing a stator for an electric machine with a cylindrical stator body, a housing surrounding the stator body and a plurality of windings. In this case, the windings are preferably arranged so as to run parallel to or at an angle to a mid-axis of the stator body along the stator body and protrude in the longitudinal direction beyond the stator body in the form of end windings at end faces of the stator body. The housing surrounding the stator body in this case has an end region, which protrudes in the longitudinal direction beyond the stator body. In this case, a first accommodating region is intended to be formed on the protruding end region of the housing, said first accommodating region surrounding a first of the end windings so as to bear tightly against a first end face of the stator body.

In addition, a method for manufacturing a stator for an electric machine is proposed. The method comprises the following method steps, preferably in the order given: (a) providing a cylindrical stator body; (b) arranging windings along the stator body in such a way that the windings protrude in the longitudinal direction beyond the stator body in the form of end windings at end faces of the stator body; (c) providing a housing, which is designed to surround the stator body, wherein a first accommodating region is formed on an end region of the housing, which first accommodating region is designed to surround a first of the end windings so as to bear tightly against a first end face of the stator body; and (d) assembling the housing with the stator body in such a way that the first end winding is accommodated in the accommodating region and is pressed therewith.

Embodiments of the stator according to the invention or of the manufacturing method according to the invention for such a stator can be considered, inter alia, as being based on the following concepts and insights:

In electric machines, a considerable quantity of lost heat is usually released during operation. Therefore, the electric machine and in particular the stator thereof needs to be cooled during operation. For this purpose, in the case of conventional electric machines, for example, a heat sink of a cooling apparatus can be arranged so as to bear tightly against the solid stator body or can be integrated therein. In general, the stator body consists of a metallic material which has a good thermal conductivity, with the result that the wire windings arranged on the stator body emit the heat released therein to the stator body effectively and can pass this heat on to the cooling apparatus via said stator body.

However, in the region of the end windings, i.e. outside the end faces of the stator body, the wire windings are no longer in direct thermal contact with the stator body. In the case of conventional electric machines, the end windings are merely surrounded by air and can only be cooled by this air, which means that the windings in the region of the end windings can be heated to high temperatures.

It is now proposed to develop the housing surrounding the stator body in such a way that at least one first accommodating region is formed on the housing, which first accommodating region, in the assembled state of the electric machine, surrounds an end winding which protrudes beyond an end face of the stator body in such a way as to bear tightly against said end winding. Owing to the fact that the housing bears tightly against the end winding, intensive thermal contact between the end winding and the housing can be provided, with the result that heat generated in the end winding can be dissipated effectively to the housing.

In this case, the housing itself can consist of a material with good thermal conductivity, such as a metal, for example, or at least have regions with good thermal conductivity, with the result that the heat absorbed by the end winding in the accommodating region can be dissipated effectively and preferably passed toward a cooled region of the electric machine.

For example, the housing can be provided with a cooling device for cooling the stator body accommodated therein and the end windings. For this purpose, the housing can have, for example, one or more channels integrated in the housing, through which channels a coolant can be passed.

The accommodating region provided in the end region of the housing can be formed integrally with the rest of the housing. For example, overhangs, projections, depressions, cutouts, etc. can be formed on or in the housing in such a way that a geometry of an accommodating region formed thereby is substantially complementary to a geometry of the end winding to be accommodated in the accommodating region. The end winding can in this case initially still have relatively large dimensions prior to fitting of the stator since the windings in the region of the end winding have not yet been pressed with one another so as to bear tightly against one another. Owing to the geometric configuration of the accommodating region provided on the housing, a force can be exerted on the windings running in the end winding by the accommodating region during assembly of the housing with the stator body in such a way that the windings are pressed at the point where they come into contact with the accommodating region of the housing in the region of the end winding.

Such a pressing operation can be used to bring the windings into tight contact both with one another and with the surface of the accommodating region, with the result that interspaces between the windings or between windings and the accommodating region are minimized. Such a pressing operation can thus result in good thermal contact both between the individual windings and between the windings and the accommodating region and therefore with the housing.

The individual windings of the stator are generally electrically insulated from one another by a thin surrounding insulating layer. Should this insulating layer be damaged, for example during the manufacturing process, individual windings can have exposed metallic regions. In the event of such exposed regions coming into contact with electrically conductive material of the housing in an accommodating region, there is thus the risk of a local short circuit or a local connection to ground.

In order to avoid this, the invention proposes arranging a layer consisting of electrically insulating cladding material on the accommodating region on a surface directed toward the end winding. This layer can be very thin, for example thinner than 0.1 mm, since the layer is merely intended to ensure electrical insulation and is not intended to perform any substantial mechanical tasks. The thickness of the layer can in this case be selected such that the electrical insulation function of the layer is ensured to a sufficient extent and nevertheless sufficiently effective heat transfer from those windings of the end winding which bear against the layer through the insulating layer to the metallic material of the housing can take place.

In an advantageous configuration, the electrically insulating cladding material can be formed with the aid of a ceramic matrix material, in which metal particles, for example silver or copper particles, are embedded. The ceramic-like matrix material is in this case electrically insulating and the metal particles are embedded with such a density that, in general, no electrical contact is produced between adjacent metal particles, with the result that the cladding material overall has an electrically insulating effect. Nevertheless, such a cladding material can have comparatively good thermal conductivity owing to the embedded metal particles.

The layered cladding material can in this case be arranged as a separate insert on the surface of the housing in the accommodating region. Alternatively, the surface of the accommodating region can be coated or sprayed with such a cladding material, or the cladding material can be applied to this surface in another way.

In an alternative configuration, the cladding material can be formed, for example, with the aid of paper, a polymer film, Pertinax, pressboard or a polyamide film. All of these materials can firstly have an electrically insulating effect and secondly allow sufficient thermal conductivity through the material layer.

While the end winding protruding beyond the stator body at one end at the end face there can be in thermal contact with the accommodating region on the housing, for manufacturing reasons it may be difficult to bring the end winding which protrudes beyond the end face at the opposite end into thermal contact with the surrounding housing as well.

Therefore, a further configuration proposes providing the stator additionally with an end plate or a terminating ring, which are each fixed, for example, to the housing of the stator by virtue of being pressed therewith. Then, a second accommodating region can be formed on such an end plate or terminating ring, which second accommodating region can surround the second end winding so as to bear tightly against said second end winding. Therefore, heat can thus be passed from the second end winding via the accommodating region of the end plate or terminating ring and the end plate or terminating ring itself onto the housing and possibly a cooling apparatus provided there.

An end plate is in this case understood to mean a cover for the housing of the electric machine which protects the machine interior from touching contact, for example, and can accommodate the bearings of the shaft ends of an armature accommodated in the electric machine. In order to ensure an air gap between a stator and the armature of the electric machine which is as uniform as possible, the end plate is in this case usually fitted very precisely into the stator housing. In this case, the end plate can act as an A end plate, i.e. be arranged on an output side of the electric machine and bear a fixed bearing or can be formed as a B end plate and be arranged on the fan side of the electric machine.

Alternatively, a terminating ring can be provided on the stator, which terminating ring in turn has a second accommodating region, which can surround the second opposite end winding so as to bear tightly against said end winding. A terminating ring can in this case be understood to mean an additional ring which produces a connection between the end winding and the housing.

As a further alternative, an end guard can be provided on the stator. Such an end guard can be joined to the cylindrical region of the housing on an end side of the stator in order to close said stator. In turn, a second accommodating region can be formed on the end guard, which second accommodating region can surround the second opposite end winding so as to bear tightly against said second end winding.

The second accommodating region which is provided on the end plate or the terminating ring or the end guard can have a similar design to the first accommodating region provided on the housing, i.e. its dimensions can be matched, for example, to the dimensions of the second end winding to be pressed and a layer consisting of electrically insulating cladding material can be provided on its surface.

In order to be able to achieve a tightly bearing contact between the end windings and the respective accommodating regions during manufacture of the stator, the housing, on one side, and the stator body or the end plate or the end guard, on the other side, can be assembled with a sufficiently high force that the turns of the end winding which protrude on the end side of the stator body are deformed by the respective accommodating region and are pressed so as to be in close contact with one another.

In order in this case to reduce the risk of damage to the windings in the end windings, the end winding can be deformed into an outwardly tapering form prior to assembly of the housing with the stator body. Owing to such an outwardly tapering form, it is possible to avoid a situation in which, for example, individual windings protrude to too great an extent out of the end winding and are damaged during assembly of the housing with the stator body.

As an alternative or in addition, prior to the assembly of the housing with the stator body, an additional joining part can be arranged adjacent to the first accommodating region of the housing and in alignment therewith. With the aid of such a joining part arranged with alignment, it is likewise possible to avoid a situation in which individual windings of an end winding are damaged during assembly of the housing with the stator body.

It is noted that possible features and advantages of embodiments of the invention are described herein sometimes with reference to a stator according to the invention and sometimes with reference to a method according to the invention for manufacturing a stator. A person skilled in the art will be aware that features of individual embodiments can be combined or replaced advantageously and in particular can be transferred from the stator to the method, or vice verse, in order to thus arrive at further embodiments and possibly synergy effects.

BRIEF DESCRIPTION OF THE DRAWINGS

Embodiments of the invention will be described below with reference to the attached drawings, with neither the description nor the drawings being intended to restrict the invention in any way.

The figures are merely schematic and are not true to scale. Identical reference symbols are used in the figures for identical or functionally identical features.

DETAILED DESCRIPTION

Figure 1:
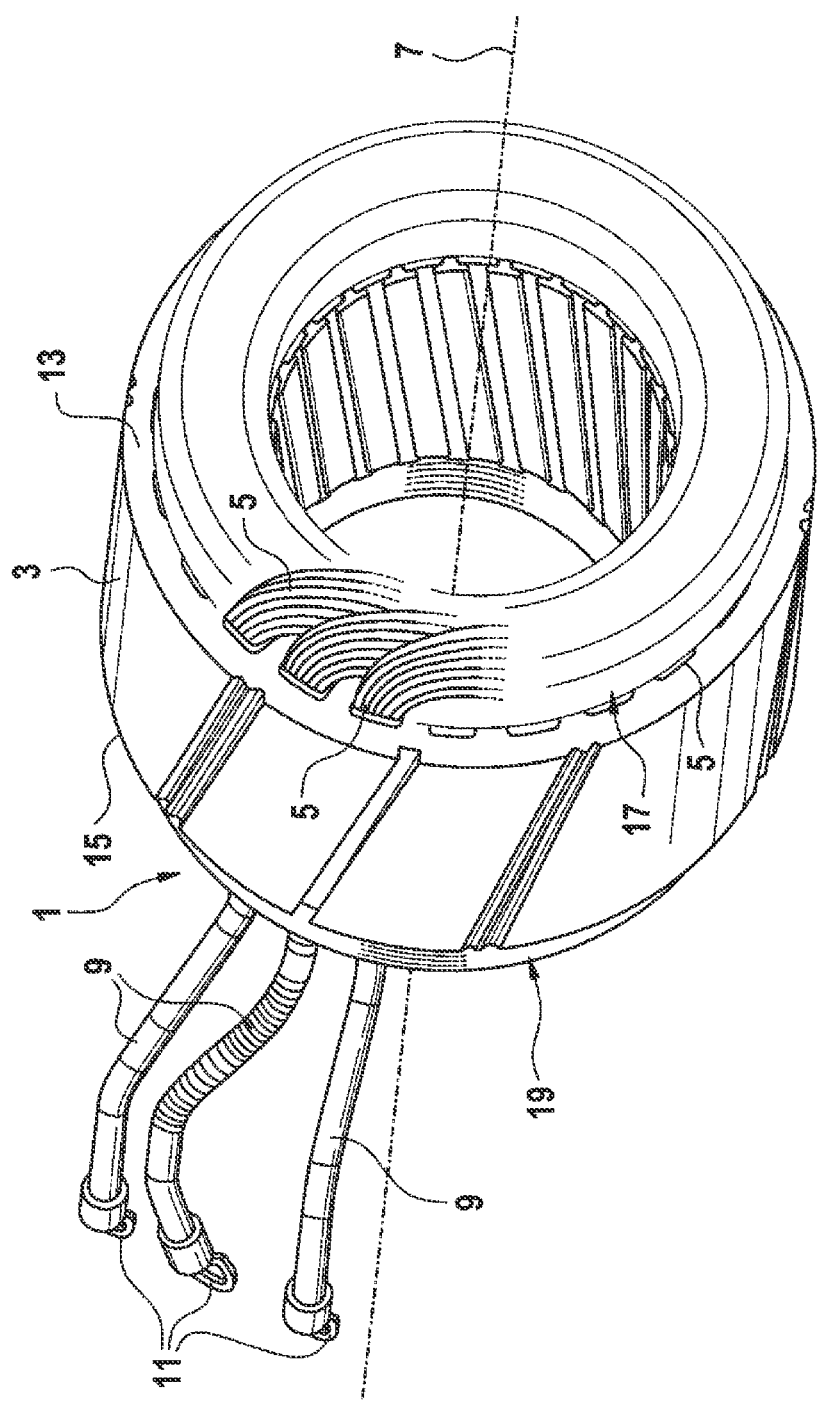
FIG. 1 shows a perspective view of a stator for an electric machine without an associated housing.

FIG. 1 shows a perspective illustration of an internal region of a stator for an electric machine. In the case of the stator 1, a large number of windings 5 are inserted or drawn into a cylindrical stator body 3. The windings 5 in this case run through channels running in the longitudinal direction of the stator body 3 or cutouts in the metallic stator body 3. In this case, the windings 5 can be arranged parallel to a mid-axis 7 of the stator body 3 in order to form a non-skewed stator. As is shown in FIG. 1, the windings can also run at an angle to the parallel of the mid-axis 7, however, in order to form a skewed stator.

Ends 9 of the windings 5 can be led out of the stator stack and provided with connections 11 for each of the electrical phases to be applied to the windings.

As illustrated in FIG. 1, in each case a bundle of a plurality of winding wires runs through one of the channels provided in the stator body 3. At the ends of the stator body 3, i.e. at the end faces 13, 15 thereof, the windings 5 protrude beyond the end faces 13, 15 of the stator body 3 and are bent back from one direction of extent substantially parallel to the mid-axis 7 towards a direction of extent substantially transverse thereto and along the circumference of the cylindrical stator body 3 at the end faces 13, 15 thereof. In this case, a first and a second end winding 17, 19 are formed adjacent to the end faces 13, 15 of the stator body 3.

In order to simplify the illustration, only the windings 5 which protrude beyond the end faces 13, 15 are illustrated schematically in FIG. 1, with three of the winding bundles being indicated and the rest of the end winding 17 constructed from windings 5 being illustrated only schematically as a ring.

FIGS. 2 to 6 illustrate longitudinal sections through subregions of the stator 3 illustrated in FIG. 1, i.e. sections parallel to the mid-axis 7.

Figure 2:
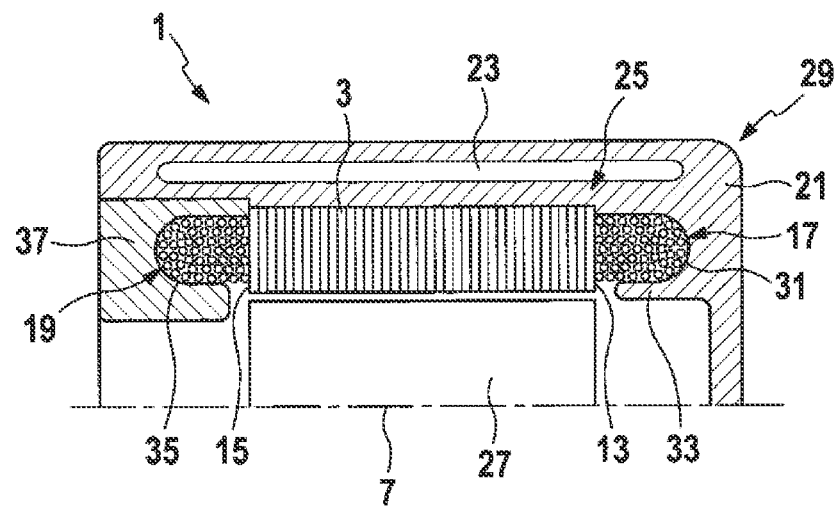
FIG. 2 shows a longitudinal section through a stator in accordance with an embodiment of the present invention.

FIG. 2 shows an embodiment of a stator 1 in which a cylindrical stator body 3 is pressed into a surrounding housing 21. The housing 21 is in this case likewise cylindrical at its inner circumference and is matched to the outer circumference of the stator body 3, with the result that the housing 21 bears against the stator body 3 with a tight press fit and therefore with good thermal contact. The housing 21 is provided with a cooling channel 23, which is part of a cooling device 25 for cooling the stator body 3. A rotor 27 is accommodated within the stator body 3.

The housing 21 protrudes in the longitudinal direction both beyond the first end face 13 and beyond the second end face 15 of the stator body 3. A first accommodating region 31 is in this case formed in an end region 29 protruding beyond the end face 13. In this case, a projection 33 is formed integrally on the housing 21. The projection 33 is formed in such a way that the accommodating region 31 has a geometry which is substantially complementary to the first end winding 17 to be accommodated therein in a pressed state. An inwardly directed surface of the accommodating region 31 thus bears tightly against the windings accommodated therein of the first end winding 17 in the assembled state of the stator. As a result, good heat transfer between the windings of the first end winding 17 and the housing 21 bearing against said end winding in the accommodating region 31 can be achieved.

In order to reduce the risk of a short circuit or a connection to ground of possibly damaged windings within the end winding 17 via the conductive material of the housing 21 in the accommodating region 31, the inwardly directed surface of the accommodating region 31 can be provided with an electrically insulating layer (not illustrated).

As an alternative to an integral design of the accommodating region 31 or the projection 33 on the housing 21, the accommodating region 31 can also be formed by a separate component part, which is fixed on the housing 21. Such a separate component part can consist of a material which is electrically insulating but has sufficient thermal conductivity, for example.

At the second end face 15, the second end winding 19 protruding there can be pressed with the aid of a second accommodating region 35, which is formed on an additional terminating ring 37 to be pressed with the housing 21. Alternatively, the second accommodating region 35 could also be integrally formed on an end plate of the electric machine (not illustrated).

Figure 3:
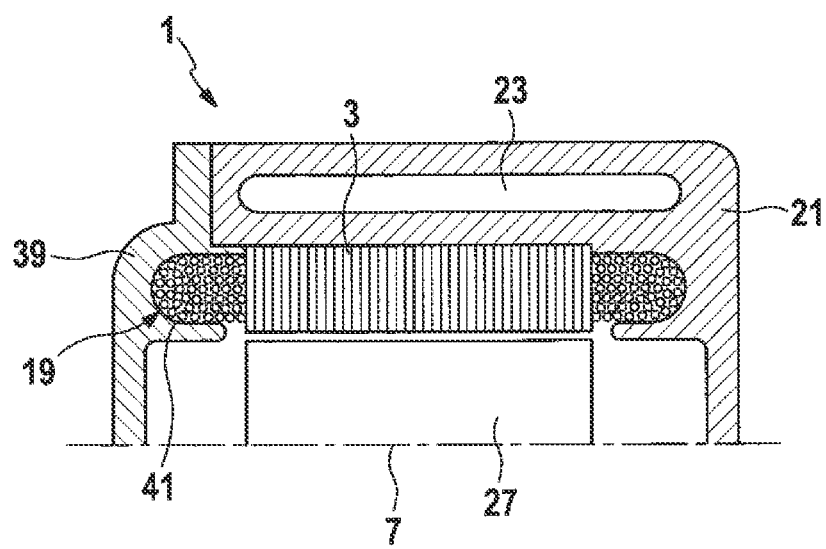
FIG. 3 shows a longitudinal section through a stator in accordance with an alternative embodiment of the present invention.

In the alternative embodiment of a rotor 1 illustrated in FIG. 3, an end guard 39 is provided on the side of the second end winding 19 instead of the terminating ring 37. A second accommodating region 41 with a form which is complementary to the second end winding 19 to be pressed is formed on this end guard 39. By virtue of such a further variant, an additional working step in the manufacture, for example for introducing the terminating ring 37, and a corresponding separate part for the construction of the electric machine can be avoided.

Figure 4:
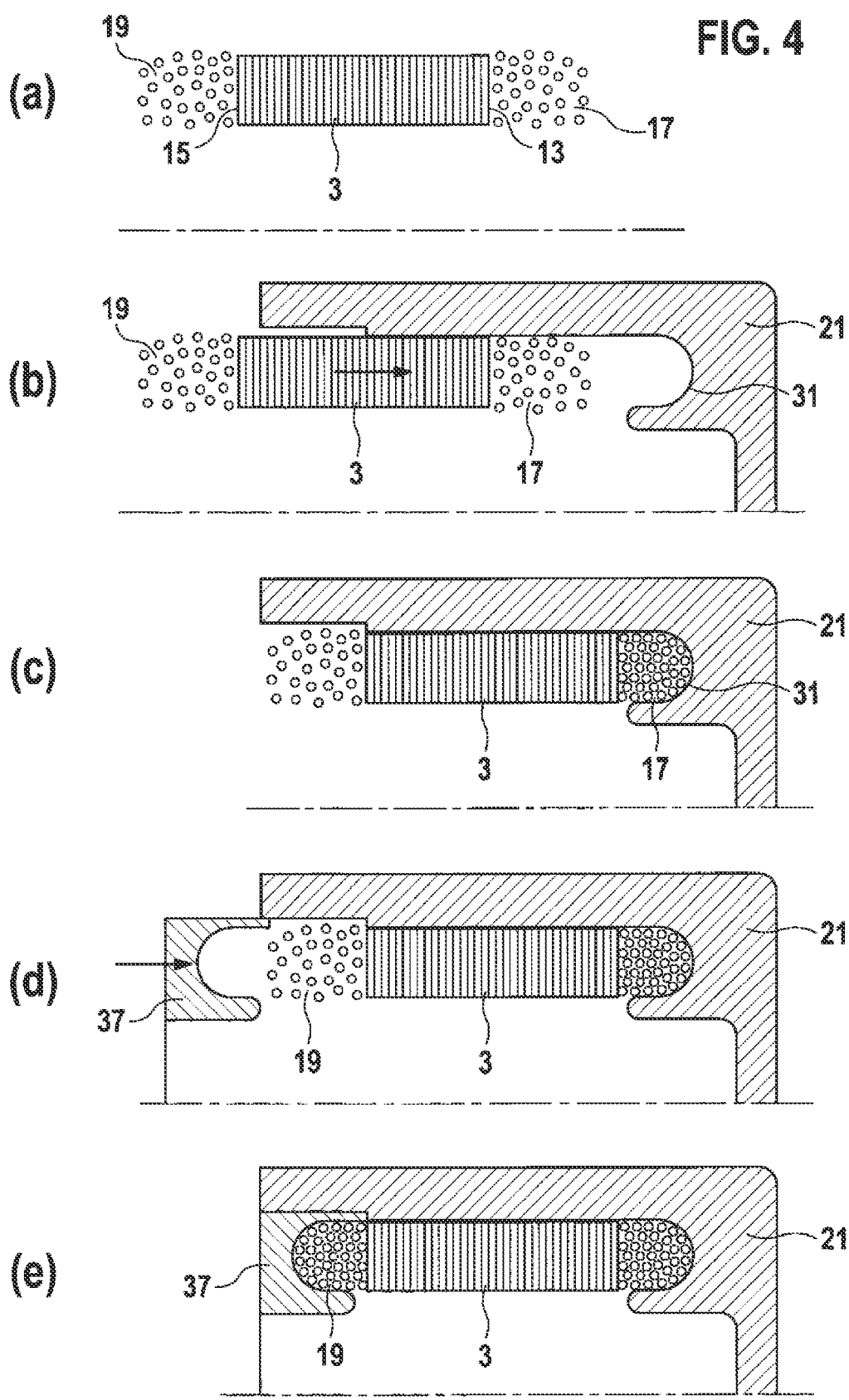
FIG. 4 illustrates a sequence of a method for manufacturing a stator in accordance with an embodiment of the present invention.
Figure 5:
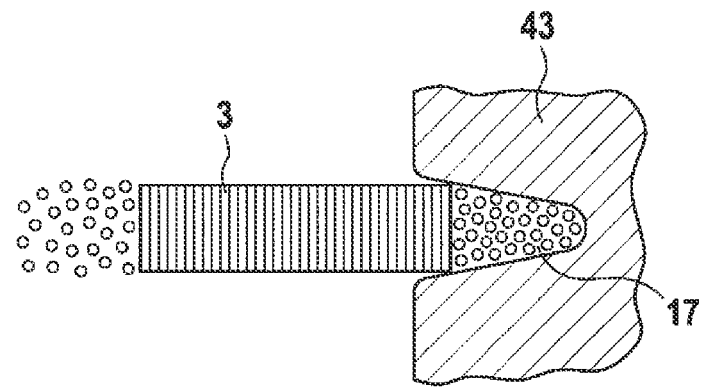
FIG. 5 illustrates a method step for deforming an end winding for a manufacturing method in accordance with a further embodiment of the present invention.
Figure 6:
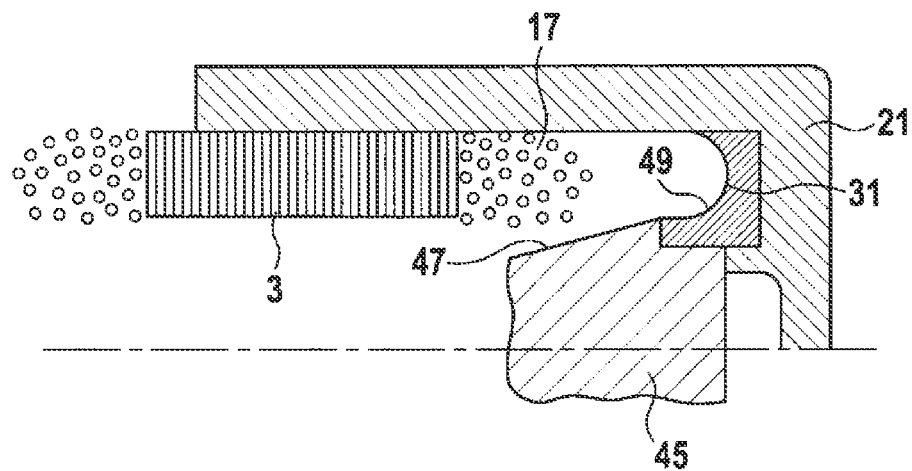
FIG. 6 illustrates another method step for a manufacturing method in accordance with a further embodiment of the present invention.

With reference to FIGS. 4 to 6, steps in a method for manufacturing a stator in accordance with an embodiment of the present invention will now be described.

As illustrated in FIG. 4(a), first a cylindrical stator body 3 is provided; in this case windings are arranged on the stator body 3 in such a way that they protrude beyond end faces 13, 15 of the stator body 3 in the form of end windings 17, 19.

Then, a housing 21 is assembled with the stator 3 (step 4(b)). In this case, the first end winding 17 is pressed so as to bear tightly by the accommodating region 31 formed on the housing 21, and the individual wires of the windings are thus fixed and brought into good thermal contact both with one another and with the housing 21 (step 4(c)).

A second joining part, for example in the form of an end guard 37 or an end guard 39, is then joined with the housing 21 on an opposite side (step 4(d)). In this case, the windings of the second end winding 19 are pressed so as to bear tightly against one another (step 4(e)).

In order to reduce the risk of the windings of an end winding 17, 19 to be pressed being damaged during joining or pressing of the housing 21 with the stator body 3 or with the additional joining part 37, 41, said end windings can be deformed to give an outwardly tapering form prior to the assembly, as is illustrated in FIG. 5. For this purpose, the end winding 17 protruding beyond the stator body 3 is pressed into a funnel-shaped die 43, for example. Alternatively, the end winding 17 could be pressed into an appropriately sized tapering form, for example with the aid of two clamping jaws.

As a further measure for reducing the risk of damage to the windings of end windings during assembly of the component parts of the stator, an additional joining part 45 can be arranged prior to the assembly of the housing 21 with the stator 3 in such a way that the joining part 45 directly adjoins the accommodating region 31 of the housing 21 and aligns a surface 47 of the joining part 45 with a surface 49 of the housing 21 in the accommodating region 31.

In the case of the stator 1 proposed herein, efficient cooling can be achieved even in the region of the end winding 17 owing to the tightly bearing pressing of the accommodating region 31 provided on the housing 21, for example with the end winding 17 protruding beyond the stator body 3. In addition, the pressing of the end windings 17, 19 with correspondingly complementarily designed accommodating regions 31, 35, 41 enables simple and reliable manufacture of such a stator 1.

What is claimed is:

1. A stator (1) for an electric machine, comprising:
a cylindrical stator body (3);
a housing (21) surrounding the stator body (3); and
a plurality of windings (5);
wherein the windings (5) are arranged so as to run along the stator body (3) and protrude in a longitudinal direction beyond the stator body (3) in the form of end windings (17, 19) at end faces (13, 15) of the stator body (3); and wherein
an end region (29) of the housing (21) protrudes in the longitudinal direction beyond the stator body (3) and a first accommodating region (31) is formed at the protruding end region (29) of the housing (21), said accommodating region surrounding a first of the end windings (17) so as to bear tightly against a first end face (13) of the stator body (3).

2. The stator according to claim 1, wherein the windings (5) are pressed, in a region of the end winding (17), in the accommodating region (31) of the housing (21).

3. The stator according to claim 1, wherein a layer consisting of an electrically insulating cladding material is arranged on the accommodating region (31) on a surface directed towards the end winding (17).

4. The stator according to claim 3, wherein the cladding material comprises a ceramic matrix material in which metal particles are embodied.

5. The stator according to claim 3, wherein the cladding material comprises a material selected from the group consisting of paper, polymer film, Pertinax, pressboard and polyamide film.

6. The stator according to claim 1, further having an end plate or a terminating ring (37), wherein the end plate or terminating ring (37) has a second accommodating region (35), which surrounds a second of the end windings (19) so as to bear tightly against a second end face (15) of the stator body (3).

7. The stator according to claim 1, further having an end guard (39), wherein the end guard (39) has a second accommodating region (41), which surrounds a second of the end windings (19) so as to bear tightly against a second end face (15) of the stator body (3).

8. The stator according to claim 1, wherein the housing (21) is provided with a cooling device (25) for cooling the stator body (3) accommodated therein and the end windings (17, 19).

9. A method for manufacturing a stator (3) for an electric machine, wherein the method comprises:
providing a cylindrical stator body (3);
arranging windings (5) along the stator body (3) in such a way that the windings (5) protrude in the longitudinal direction beyond the stator body (3) in the form of end windings (17, 19) on end faces (13, 15) of the stator body (3);
providing a housing (21), which is designed to surround the stator body (3), wherein a first accommodating region (31) is formed at an end region (29) of the housing (21), said first accommodating region being designed to surround a first of the end windings (17) so as to bear tightly against a first end face (13) of the stator body (3); and
assembling the housing (21) with the stator body (3) in such a way that the first winding (17) is accommodated in the accommodating region (31) and is pressed therewith.

10. The method according to claim 9, further comprising:
deforming the first end winding (17) into an outwardly tapering form prior to the assembly of the housing (21) with the stator body (3).

11. The method according to claim 9, further comprising:
introducing an additional joining part (45) adjacent to the first accommodating region (31) of the housing (21) and in alignment with the first accommodating region (31) of the housing (21) prior to the assembly of the housing (21) with the stator body (3).

* * * * *